United States Patent [19]

Hawthorne

[11] Patent Number: 5,324,879
[45] Date of Patent: Jun. 28, 1994

[54] OLIGOMERIZATION PROCESS

[75] Inventor: David G. Hawthorne, South Oakleigh, Australia

[73] Assignee: Commonwealth Scientific and Industrial Research Organisation, Campbell, Australia

[21] Appl. No.: 751,631

[22] Filed: Aug. 26, 1991

Related U.S. Application Data

[63] Continuation of Ser. No. 497,793, Mar. 22, 1990, abandoned, which is a continuation of Ser. No. 126,140, filed as PCT/AU86/00372, Dec. 3, 1986, abandoned.

[30] Foreign Application Priority Data

Dec. 3, 1985 [AU] Australia .................. PH3694/85

[51] Int. Cl.$^5$ .......................... C07C 2/26; C07C 2/34; C08F 4/26
[52] U.S. Cl. .................................. 585/511; 585/510; 585/520; 526/147; 526/170; 526/171; 526/173
[58] Field of Search ............... 526/147, 170, 171, 172; 585/511, 520, 510

[56] References Cited

U.S. PATENT DOCUMENTS

| | | | |
|---|---|---|---|
| 3,681,317 | 8/1972 | Pioli et al. | 526/170 |
| 3,739,003 | 6/1973 | Codet et al. | 526/172 |
| 3,803,254 | 4/1974 | Hattori et al. | 526/171 |
| 3,980,730 | 9/1976 | Dawans et al. | 526/172 |
| 4,169,092 | 9/1979 | Bayer . | |
| 4,526,945 | 7/1985 | Carlson et al. | 526/172 |
| 4,680,352 | 7/1987 | Janowicz et al. | 526/172 |
| 4,694,054 | 9/1987 | Janowicz | 526/147 |
| 4,746,713 | 5/1988 | Janowicz | 526/170 |
| 4,886,861 | 12/1989 | Janowicz | 526/145 |
| 5,227,562 | 7/1993 | Wu | 585/511 |

FOREIGN PATENT DOCUMENTS

| | | |
|---|---|---|
| 47610 | 2/1966 | Australia . |
| 196783 | 10/1986 | European Pat. Off. . |
| 199436 | 10/1986 | European Pat. Off. . |
| 1199387 | 7/1970 | United Kingdom . |

OTHER PUBLICATIONS

Chemical Abstracts 93:270882, vol. 93, 1980.
Chemical Abstracts 107:154992s, vol. 107, 1987.
Karmilova, "Metalloporphyrins as Catalysts of Chain Transfer in Radical Polymerization and Stereoselective Oxidation", Russian Chemical Reviews, 53(2). 1984.

Primary Examiner—Jerry D. Johnson
Attorney, Agent, or Firm—Sughrue, Mion, Zinn, Macpeak & Seas

[57] ABSTRACT

Oligomers are produced from unsaturated monomers. They contain terminal unsaturation and have a degree of polymerization of from 2 to 200. These oligomers are produced by the free radical polymerization of unsaturated monomers using as an initiator and/or chain transfer agent in the process a transition metal complex comprising a metal cation and at least one chelating agent, said transition metal complex being generally in accordance with formula (I), wherein M is a transition metal ion which can form hexa- or penta-coordinated structures and, when complexed in this manner, has two or more readily interconverted adjacent valence states, R is hydrogen or an organic group or a transition metal complex derived form formula (I) and L is a ligand or controlling the stability and electron transfer properties of the transition metal complex and consists of an electron pair donor (Lewis base) capable of coordination with the metal ion.

19 Claims, 1 Drawing Sheet

OLIGOMERIZATION PROCESS

This is a continuation of application Ser. No. 07/497,793 filed Mar. 22, 1990 now abandoned, which is a continuation of application Ser. No. 07/126,140 filed as PCT/AU86/00372, Dec. 3, 1986, now abandoned.

BACKGROUND OF THE INVENTION

This invention relates to processes for radical-mediated polymerization of unsaturated species, and for the control or limitation of the molecular weights of the polymeric products produced from such processes. Polymers of limited molecular weights, or oligomers, are useful as precursors in the manufacture of other polymeric materials, and as additives in plastics, elastomerics, and surface-coating compositions, as well as being useful in their own right in many applications.

In conventional polymerization practice, manufacture of oligomers requires the use of a free radical source, the initiator, and of a chain-transfer agent. The chain-transfer agent controls the molecular weight of the polymer molecules by reacting with the propagating radical species to terminate its growth and later initiates a new polymer chain thus transfering the growth process from one discrete polymer molecule to another discrete polymer molecule. At least a part of the chain-transfer agent is incorporated into the polymer molecules, and thus is consumed during the process which may result in undesirable increases in average molecular size and polydispersity of the product. The incorporated residue of the chain transfer agent can also lead to undesirable end-groups on the polymer.

Transition metal complexes are widely used as polymerization agents, but principally as catalysts or coagents in redox radical initiation systems, for example, with organic peroxides for the curing of styrene/unsaturated polyester formulations, or in the initiation of ionic polymerization, for example, of epoxides. Transition metal complexes have also been used for the control of stereochemistry and the inhibition of crosslinking (gel formation) in the polymerization of butadene and other olefins. Transition metal complexes, including species related to those described in the specification have also been used as catalysts for the hydrogenation or oxidation of organic compounds.

SUMMARY OF THE INVENTION

We have now discovered that certain transition metal complexes can act as thermal or photochemical radical initiators and also as chain-transfer catalysts for the control of molecular weight in radical-mediated homogeneous polymerizations. Unlike the conventional chain-transfer agents, the agents described in this specification are not consumed during the polymerization process, thereby resulting in more efficient useage with no residues as end-groups, and improved control of the molecular weights of the products.

According to one aspect of the present invention there is provided a process for the free radical polymerization of unsaturated monomers which comprises using as an initiator and/or chain transfer agent a transition metal complex comprising a metal cation and at least one chelating agent, said transition metal complex being generally in accordance with formula I

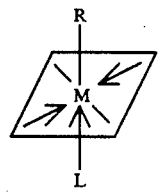

wherein M is a transition metal, R is hydrogen or an organic group or a transition metal complex derived from formula I, and L is a ligand for controlling the stability and electron transfer properties of the transition metal complex, and consists of an electron pair donor (Lewis base) capable of coordination with the metal ion.

DETAILED DESCRIPTION OF THE INVENTION

Typical transition metal complexes are illustrated in the accompanying drawings, and described below.

Figure 1:
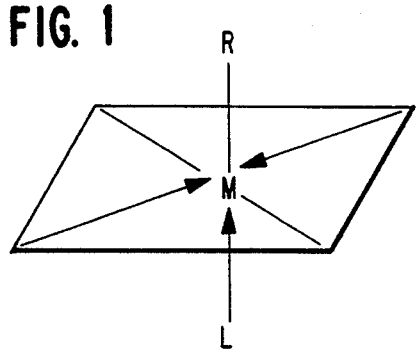
FIG. 1 shows a structural formula I of a transition metal complex in accordance with the present invention.

In one form, the transition metal complexes which are useful in the process of the present invention comprise a metallic cation (M) coordinated with a planar (equatorial), or approximately planar, arrangement of chelating ligands, with one or two axial ligands as shown by formula I shown in FIG. 1. One of the axial ligands (R in formula I) consists of a hydrogen atom or an organic moiety bound by a labile carbon-metal bond to the transition metal. The other ligand (L in Formula I) is an electron pair donor, as defined above.

Figure 2:
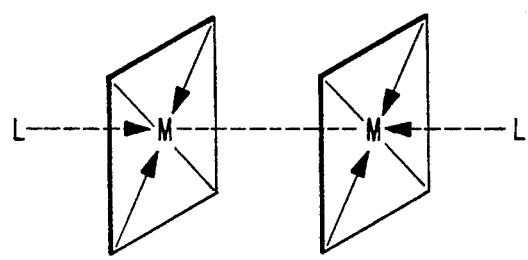
FIG. 2 shows a structural formula II of a dimeric transition metal complex in accordance with the present invention.
Figure 3:
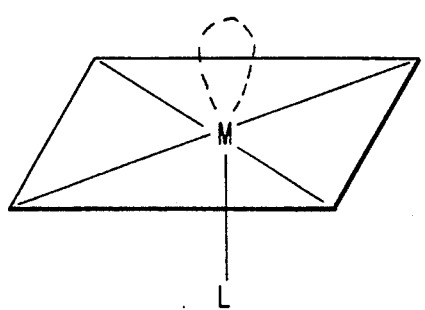
FIG. 3 shows a structural formula III of a monomeric species which can be formed from or which may exist in equilibrium with the dimeric transition metal complex of structural formula II of FIG. 2.

Alternatively, the transition metal complex may have the related dimeric structure of formula II shown in FIG. 2, in which the group R of formula I shown in FIG. 1 comprises a second chelated metal ion, and which is capable of dissociation to form (or may exist in equilibrium with) the monomeric species III shown in FIG. 3 and is capable of reaction with radicals or other species present in the polymerizing system to form intermediates functionally equivalent to those of formula I. The second chelated metal ion may be the same or different from the first metal ion.

The transition metal ion may be any of those which can form hexa- or penta-coordinated structures as described and which, when complexed in this manner, have two or more readily interconverted adjacent valence states. Cobalt ions are particularly useful, but those of other metals such as rhenium or iridium may be employed.

Figure 4:
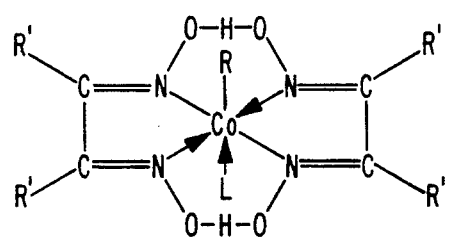
FIG. 4 shows a structural formula IV of a bis(dialkyl)gloxime cobalt chelate in accordance with the present invention.
Figure 6:
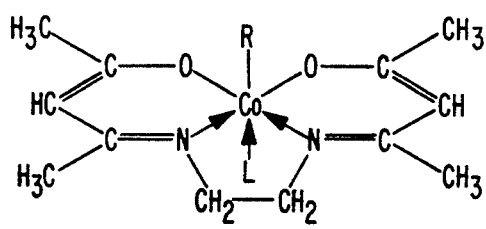
FIG. 6 shows a structural formula VI of an acetylacetone-diamine chelate in accordance with the present invention.
Figure 5:
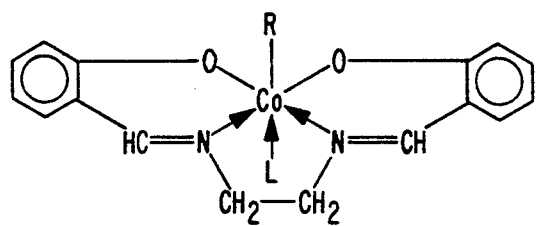
FIG. 5 shows a structural formula V of a salicylaldehydediamine chelate in accordance with the present invention.

The equatorial coordination may be obtained from a single quadridentate chelating ligand, from two bidentate ligands, or from one bidetate ligand plus two monodentate ligands, or any other appropriate combination of ligands. The chelation may involve both ionic/covalent bonding and coordinative bonding between the ligand and the metal ion and should preferably result in a complex which has no net ionic charge and is soluble in non-polar or polar organic solvents. The complexes may include ligands which can give rise to ionized complexes through protonation or deprotonation of the ligand, for example, of the bridging hydroxo groups of the bis(dimethyl glyoxime) cobalt chelate (formula IV shown in the FIG. 4) or which bear other ionizable groups. Suitable chelating ligands may consist of dioximes or other dicarbonyl or enolic carbonyl derivatives, or hydroxy, carboxy or enolic derivatives of azomethines (Schiff bases), such as salicylaldehyde-diamine (formula V shown in FIG. 5) or acetylacetone-diamine (formula VI shown in FIG. 6) condensates. Complexes formed from dioximes, such as dimethylglyoxime (formula IV shown in FIG. 9, R'=methyl), or derivatives in which the bridging hydrogens (formula IV shown in FIG. 4) are replaced by difluoroborato groups, are also useful.

The covalently-bound axial organic group (R) may consist of an alkyl, aryl, or heterocyclic species, or of substituted derivatives of these species which are capable of homolyric dissociation from the metal ion on heating or on irradiation with visible or ultraviolet light. Alkyl derivatives bearing one or more substituents on the carbon bonded to the metal ion are particularly useful; such substituents may include nitrile, ester, aromatic and substituted aromatic groups. However, any suitable substituent group may be employed. Alternatively, the group (R) may consist cf a halide or other anion bound to the chelated metal.

The axial ligand (L) can be, for example, water, an alcohol or other hydroxylic species, a thioether, amine, phosphine, carbonyl or carboxylate, or any other species which does not inhibit dissociation of the opposing axial ligand. Particularly useful ligands include weakly basic tertiary amines such as pyridine or substituted pyridines. The ligand L may also be derived in situ from the monomer or another species present in the polymerization mixture. Therefore, useful agents may also include species which lack the axial ligand (L), such as the Schiff's base chelates described in Examples 14 to 16, when used in formulations containing a suitable base as an ingredient.

Methods for the preparation of planar chelation complexes of transition metals, such as those useful in the present invention, are widely known, and methods for the preparation of suitable derivatives thereof, such as those bearing labile covalently bound axial ligands have also been described in the chemical literature. Any conventional or suitable method of making the transition metal complexes for use in the present invention may be used. Some suitable methods are described in Examples 1, 8 and 9 hereinafter.

In another aspect, the present invention provides a process for the-free-radical polymerization of unsaturated monomers using the above described transition metal complexes as initiators and chain transfer agents. Suitable unsaturated monomers include methacrylate esters, vinyl esters, vinylaromatics, or mixtures of these; they may also include acrylic esters, other vinyl derivatives and unsaturated species susceptlble to free-radical induced polymerization. The polymerization of methacrylate esters and styrene appear to be the most susceptible to catalytic chain transfer using the agents of this invention, whilst less susceptible monomers, for example, acrylate esters may require the addition of methacrylates as comonomers for transfer to be effective.

Some oxime derivatives (e.g. formula IV shown in FIG. 4) or the active chain transfer intermediates derived therefrom may be susceptible to hydrolysis and resultant loss of catalytic activity. The difluoroborato derivatives (Example 10) are more resistant to hydrolysis, and can be used for the preparation of acidic oligomers, such as menhacrylic acid polymers and copolymers.

The use of the chain transfer catalysts, in accordance with the present invention, for the control of molecular weight typically involves the following procedure. The transition metal complex is dissolved in a mixture of monomer or monomers and inert solvent, and heated or exposed to actinic light under an inert atmosphere to initiate the polymerization reaction. The molecular weight of the product can be altered by altering the ratio of complex to monomer in the polymerization formulation, or the reaction temperature. The complexes described in this specification, and their by-products, can be removed by filtering the product solution through a layer of silica, to which they are generally strongly adsorbed. The efficiency of the polymerization process can be enhanced by addition of non-oxidizing initiators, such as azo-derivatives, to the polymerization formulation to compensate for propagating radicals which are destroyed by bimolecular recombination or disproportionation, reactions which proceed in competition with the propagation and chain-transfer reactions.

The oligomers produced in accordance with the present invention generally have a degree of polymerization of from 2 to 200. They are unique in that they contain reactive terminal unsaturation which can undergo known reactions for unsaturated groups. For example, they may be reduced by catalytic hydrogenation, or be utilized in subsequent copolymerization with other unsaturated monomers, especially vinylic or acrylic monomers, or be modified by chemical reaction to produce other functional oligomers.

The present invention will now be described more fully with reference to the following examples.

Unless otherwise stated, molecular weights of products described in the Examples are number-average polystyrene-equivalent molecular weights. The acronyms MMA and AIBN refer respectively to methyl methacrylate and azobisisobutyronitrile.

EXAMPLE 1

Bis-[(2,3-butanedione dioximato)(1-)N,N'](1-cyano-1-methylethyl)(pyridine)cobalt(III), Agent 1, was prepared using a well known general procedure: cobaltous acetate tetrahydrate (25 g) and dimenhylgiyoxime (23.2 g) were-dissolved in deaerated methanol (325 ml) under a nitrogen atmosphere, and the mixture stirred at 20° C. for 1 hour. Deaerated methacrylonitrile (8.5 g) was then added and the nitrogen atmosphere replaced with hydrogen an atmospheric pressure. The mixture was then vigorously stirred while deaerated pyridine (8 g) was added. Stirring was continued until 1.0 to 1.2 1 of hydrogen had been adsorbed, after which the mixture was filtered and diluted with cold water (ca. 800 ml). The Agent 1 crystallized as deep orange platelets, yield 26 g.

A deoxygenated mixture of MMA (2 ml), benzene (8 ml) and Agent 1 (95 mg) was heated at 60° C. for 30 hours. After cooling, the acicular crystals of chelate dimer which formed during the reaction were separated, and the remaining chelate byproducts removed by adsorption in silica to produce a colorless solution containing 1.2 g of oligo-MMA, consisting largely of the dimer, plus a small proportion of trimer. Similar treatment of methyl methacrylate in the absence of Agent 1 yielded negligible amounts of polymer. The byproduct chelates are rapidly oxidised on exposure to air, forming dark-colored species which could also be readily removed from the solution by adsorption on silica.

EXAMPLE 2

Bis-[(2,3-butanedione dioximato) (1-)N,N'](1-cyanoethyl) (pyridine) cobalt(III), Agent 2, was prepared using the method of Example 1, with acrylonitrile (7.4 g) instead of the methacrylonitrile.

A deoxygenated mixture of MMA (5 ml) and Agent 2 (20 mg) in benzene (10 ml) was exposed to near-UV light from an 80W filtered high-pressure mercury lamp for 3 hours. The chelate byproducts were then removed by adsorption on silica, and the product solution distilled under vacuum, yielding 0.5 g of MMA dimer.

EXAMPLE 3

A deoxygenated mixture of MMA (4 ml) and Agent 1 (1.2 mg) in benzene (6 ml), with AIBN (20 mg) as coinitiator, after heating at 60° C. for 36 hours, yielded 1.7 g of oligo-MMA having a molecular weight of 250. A similar treatment of MMA in the absence of Agent 1 yielded a polymer having a molecular weight of 87000, whilst use of 0.5 mg or 0.1 mg of the Agent yielded oligomers having molecular weights of 450 or 5100 respectively and a polydispersity ratio (MW/MN) of ca. 1.6. A similar treatment using 0.5 mg of Agent 1, but at 70° C., yielded oligomers having a molecular weight of 300.

EXAMPLE 4

A series of deoxygenated mixtures of monomer (2 ml) and AIBN (30 mg) in benzene (8 ml), with or without Agent 1 (5 mg), after heating at 60° C. for 36 hours, yielded polymers having the molecular weights shown in the Table.

| Monomer | With Agent 1 | Without Agent 1 |
| --- | --- | --- |
| Methyl methacrylate | 250 | 18,000 |
| n-Butyl methacrylate | 300 | 25,000 |
| Methacrylonitrile | Dimer | High polymer |
| Styrene | 500 | 10,000 |
| Vinyl acetate | 15,000 | 216,000 |
| Ethyl acetate | 82,000 | 111,000 |

A similar polymerization of styrene, but using either Agent 1 or Agent 2, with toluene as solvent and 1,1-azobis(1-cyanocyclohexane) as initiator at 95° C., yielded a mixture of styrene dimer and trimer; polymerization in the absence of the Agent yielded polymer with a molecular weight of 13,700.

EXAMPLE 5

Analogues of Agent 1, but with ligands (L) of different basicity were prepared using the method of Example 1, replacing the pyridine with the more-basic 4-t-butylpyridine (5 ml), to form Agent 3, or with less-basic 4-cyanopyridine (6 ml) to form Agent 4. These Agents were used in polymerization of styrene according to the method of Example 4, the reaction in the presence of Agent 3 yielding an oligomeric mixture with molecular weight of 500, whilst a similar treatment using Agent 4 produced an oligomer having molecular weight of 2000. Polymerization of MMA in the presence of either reagent yielded predominantly MMA dimer.

EXAMPLE 6

A series of mixtures containing MMA and a comonomer were treated with by the method of Example 4. The comonomer proportions and the molecular weights of the copolymers are shown in the Table:

| Comonomer | MMA | Mol. Wt. |
| --- | --- | --- |
| Ethyl acrylate, 0.5 ml | 1.5 ml | 6,800 |
| Ethyl acrylate, 1.0 ml | 1.0 ml | 30,000 |
| Ethyl acrylate, 1.5 ml | 0.5 ml | 66,000 |
| Methacrylonitrile, 1.0 ml | 1.0 ml | dimers |
| Glycidyl methacrylate, 1.0 ml | 1.0 ml | dimers |

A similar treatment of a mixture of hydroxyethyl methacrylate (0.5 ml) and MMA (2 ml) in benzene (5 ml), with Agent 1, (1 mg) yielded a polymer having molecular weight of 5,500. Treatment in the absence of the Agent yielded a polymeric gel.

EXAMPLE 7

Bis-[(2,3-butanedione dioximato)(1-)N,N'](1-ethoxycarbonylethyl)-(pyridine) cobalt (III), Agent 5, was prepared using the method of Example 1, using ethyl acrylate (5 g) instead of the methacrylonitrile. Treatment of MMA with the Agent yielded an oligomeric mixture consisting predominantly of the dimer.

EXAMPLE 8

Bis-[(2,3-butanedione dioximato)(1-)N,N'](2-ethoxycarbonylethyl)-(pyridine)cobalt(III), Agent 6, was prepared by the following method. A mixture of cobaltous chloride hexahydrate (11.9 g), and dimethylglyoxime (11.6 g) was dissolved, with stirring, in deaerated 90% ethanol (200 ml) under nitrogen. The following deaerated reagents were then added in sequence: sodium hydroxide (4 g in 25 ml water), pyridine (4 g) , ethyl acrylate (5 g), sodium hydroxide (1 g in ±6 ml water). The resultant mixture was stirred for 5 minutes and then poured into water (500 ml) containing acetic acid (2.5 ml). The Agent was recovered by extraction of the aqueous mixture with methylene chloride, evaporation of the extract, and recrystallization of the residue from aqueous methanol.

Treatment of MMA (1.9 g) with Agent 6 at 60° C. by the method of Example 4 yielded a mixture of oligomers consisting of dimer (0.8 g), trimer (0.6 g), plus higher oligomers.

EXAMPLE 9

19 Bis-[(2,3 -butanedione dioximato) (1 -)N ,N'](1-methyl-ethyl)(pyridine)cobalt(III), Agent 7, was prepared by the following method. A mixture of cobaltous chloride hexahydrate (17.2 g), dimethylglyoxime (17.2 g) was dissolved, with stirring, in deaerated methanol (200 ml) under nitrogen. Sodium hydroxide (6 g in 6 ml water) and pyridine (6 g) was then added, the resultant mixture cooled to, and maintained at −10° C. The chilled mixture was stirred for 15 minutes and then sodium hydroxide (3 g in 3 ml water) was added, followed by the slow addition of sodium borohydride (0.4 g in 5 ml water). After stirring a further 15 minutes, isopropyl bromide (6.8 g) was added, and the mixture allowed to warm to room temperature. The bulk of the solvent methanol was removed by vacuum evaporation, and the residue added to chilled water (200 ml) containing pyridine (2 ml); the Agent crystallized on standing of the chilled solution and was recrystallized from aqueous methanol.

The methyl analogue of Agent 7, Agent 8, was prepared using a similar procedure, except that the isopropyl bromide was replaced by methyl sulphate (10.1 g).

MMA was treated at 70° C. with the Agents using the method of Example 4. Treatment with Agent 7 yielded MMA dimer, whilst treatment with the less active Agent 8 yielded a mixture of dimer, trimer, and higher oligomers.

EXAMPLE 10

Bis-[(2,3-butanedione dioximato)(2-)O:O']-tetrafluorodiborato (2-) -N ,N',N",N"'](1-methylethyl)(pyridine)cobalt(III), Agent 9, was prepared as follows. Agent 7 (10 g) was dissolved in a mixture of boron trifluoride etherate (15 ml) and dry ether (90 ml), and then cooled in an ice-bath whilst pyridine (8.6 ml) was slowly added. The resultant suspension was stood at 20° C. for 2 days, after which the solids were removed, the ethereal solution evaporated, and the residue, Agent 9, recrystallized from acetone.

A mixture of MMA (2 ml), Agent 9 (5 mg), AIBN (25 rag), and ethanol (8 ml) was heated at 60° C. for 36 hours. The cobalt chelate was then removed by adsorption on silica, and the ethanolic solution evaporated to yield the products, MMA dimer. A similar treatment of MMA using Agent 7 yielded a mixture of dimer and trimer, whilst treatment without addition of the Agent resulted in the formation of ethanol-insoluble poly(MMA) of high molecular weight. A similar treatment of MMA with Agent 9 using a mixture of ethanol (7.5 ml) and acetic acid (0.5 ml) as solvent also resulted in the formation of predominantly dimeric MMA, whereas treatment with Agent 7 (or Agent 1) in the acidic solvent mixture yielded products containing poly(MMA).

A deoxygenated mixture of MMA (1 ml) and methacrylic acid (1 mi) with AIBN (20 mg) and Agent 9 (1 mg) in ethanol (8 ml) was heated at 80° C. for 24 hours. The cobalt chelate was removed by adsorption on silica and the solution evaporated to yield a viscous oligomeric product having a molecular weight (after exhaustive methylation with diazomethane) of 470. A similar treatment of methacrylic acid yielded a solid oligomer with a (methylated) molecular weight of 550.

COMPARATIVE EXAMPLE 11

Bis-[( 2,3-butanedione dioximato)(1 -) N,N'](pyridine)cobalt(II), Agent 10, was prepared by dissolving a mixture of cobaltous acetate tetrahydrate (5 g) and dimethylglyoxime (4.6 g) in deaerated methanol (80 ml) containing pyridine (1.6 g) under oxygen-free nitrogen. After stirring for 1 hour, the crystalline Agent was removed by filtration, washed on the filter with methanol, and then dried in vacuum. All operations were conducted with rigorous exclusion of air, and the product stored under nitrogen as the solid Agent 10 and its solutions are rapidly oxidised on exposure to atmospheric oxygen.

The triphenylphosphine analogue of Agent 10, Agent 11, was prepared by a similar method, using triphenylphosphine (5.3 g) instead of the pyridine.

Solid agent 11 is less susceptible to oxidation that Agent 10, although its solutions are still rapidly oxidized on exposure to air. Treatment of MMA with either agent using the method of Example 4 resulted in the formation of MMA dimer.

EXAMPLE 12

Bis-[(2,3-butanedione dioximato)(1-)N,N'](chloro)(pyridine)cobalt(III), Agent 12, was prepared as follows. A mixture of cobaltous chloride hexahydrate (5 g) and dimethylglyoxime (5,5 g) was dissolved in hot ethanol. Pyridine (3.5 g) was then added, the mixture cooled to 20° C., and aerated for 1 hour. The crystallized Agent was then removed by filtration, washed successively with water and alcohol, then dried in vacuum at 20° C.

Treatment of MMA with the Agent at 60° C. using the method in Example 10 produced a mixture of oligomers containing MMA dimer and higher oligomers. The cobalt chelate byproducts were not readily adsorbed on silica. A similar treatment at 80° C. yielded a mixture of MMA dimer and trimer.

Treatment of a mixture of ethyl acrylate (1 ml), methyl methacrylate (1 ml) with the Agent at 80° C. using the method in Example 10 yielded a copolymer having molecular weight of 4,200 and polydispersity of 2.2. A similar treatment in the absence of the Agent yielded copolymer having a molecular weight of 24,300.

EXAMPLE 13

Bis-[( 1,2-diphenylethanedione dioximato)(1-)N,N'](2-methylethyl)(pyridine)cobalt(III) , Agent 13, was prepared as follows. A mixture of dehydrated cobaltous chloride (1.3 g), benzil dioxime (4.8 g) and pyridine (0.79 g) was heated with aeration on a steam bath until the mixture no longer had a blue-green coloration. The precipitated chlorocobalt(III) chelate was removed, washed with methanol, and then dried in air. The dried solid (6.2 g) was suspended in methanol (80 ml), and the suspended purged with, and maintained under nitrogen. A solution of potassium hydroxide (1.2 g in 20 ml methanol) was added and the mixture cooled with stirring to −10° C. A solution of sodium borohydride (0.14 g in 2 ml water) was added, followed by, after stirring for 15 minutes, isopropyl bromide (1.2 ml). The mixture was then allowed to warm to 20° C. and the sparingly soluble Agent 13 removed by filtration, washed with water, then with water containing 10% pyridine, and dried in-vacuo over calcium chloride.

MMA was treated with the Agent using the method of Example 4, to yield dimeric MMA. In this example, adsorption of the cobalt chelate byproducts on silica was incomplete.

In the following Examples:

Acacen is [[4,4 '-(1,2-ethanediyldinitrilo)-bis-pentanato](2-)-N,N',O,O']

Salen is [[2,2'-[1,2-ethanediylbis(nitrilomethylidyne)-bis[phenolato]](2-)-N,N',O,O']

COMPARATIVE EXAMPLE 14

(Salen)cobalt(II), Agent 14, was prepared as follows. Cobaltous acetate tetrahydrate (13.9 g) and (14.9 g) of salen (prepared by the condensation reaction between salicylaldehyde (2 mol) and ethylene diamine (1 mol)) was dissolved in nitrogen-purged methanol (185 ml). The mixture was warmed to complete the dissolution, and the Agent crystallized on cooling of the solution. The air-sensitive Agent was washed with deaerated water and then dried in-vacuo at 80° C.; it was stored in-vacuo and handled under a nitrogen atmosphere.

MMA was treated with a mixture of Agent 14 (5 mg) and pyridine (8 mg) using the method of Example 4, yielding a polymer having molecular weight-of 3,400 and polydispersity 1.8. A similar treatment without addition of pyridine yielded a polymer having molecular weight of 8,300, whilst treatment in the absence of the Agent or pyridine yielded polymer of molecular weight 18,000.

EXAMPLE 15

Ethyl(salen)cobalt(III), Agent 15, was prepared as follows, all reactions being conducted with deaerated reagents under a nitrogen atmosphere. A mixture of salicylaldehyde (7.2 g) and ethylene diamine (3.0 g) was dissolved in methanol (400 ml), cobaltous chloride nexahydrate (11.9 g) added, and the mixture stirred until the salt dissolved. Sodium hydroxide (4 g in 4 ml water) was added and the mixture cooled to 31 10° C. After 10 minutes, additional sodium hydroxide (7.5 g in 7.5 ml of water) was added, followed by sodium borohydride (1 g in 10 ml methanol) and palladous chloride (1 ml of 2% solution in 1M KCl). After 10 minutes, ethyl bromide (10 ml) was added and, 5 minutes later, any residual borohydride destroyed by the addition of acetone (15 ml). The mixture was allowed to warm to room temperature, then filtered, and the filtrate diluted with water (750 ml) containing pyridine (10 ml). The Agent crystallized as orange platelets on standing of the chilled aqueous solution. Unlike the oxime-based agents, Agent 15 crystallizes as an labile hydrate or as an anhydrous dimeric species. The Agent dissolves in non-basic organic solvents to form a green solution which is converted to the orange base-ligated species on addition of bases such as pyridine.

Treatment of MMA with Agent 15 (5 mg) by the method of Example 4, with the addition of pyridine (10 mg), yielded poly(MMA) with molecular weight of 4,100. Treatment in the absence of pyridine yielded a polymer, molecular weight 12,900, whilst treatment in the absence of Agent or pyridine produced polymer having molecular weight of 18,000.

EXAMPLE 16

Aquo(ethyl)(acacen)cobalt(III), Agent 16, was prepared by the following method. Cobaltous chloride hexahydrate (4.8 g) was dissolved in 20 ml of deaerated water under nitrogen. 4.5 g of (acacen), prepared by condensation of acetylacetone (2 mol) and ethylene diamine (1 mol), was then added, followed by sodium hydroxide (1.6 g). The mixture was heated, with stirring, until the suspended solid turned to a yellow-orange colour. The mixture was then cooled, the intermediate, (acacen)cobalt(II) filtered off under nitrogen and washed on the filter with warm deaerated water (10 ml), and then dried in-vacuo over calcium chloride. The air-sensitive anhydrous chelate (4.5 g) was dissolved in anhydrous tetrahydrofuran maintained under argon. Sodium amalgam (0.38 g sodium in 5 g mercury) was added, and the mixture stirred vigorously for 2 hours, then cooled to $-10°$ C. Ethyl bromide (1.4 m) was added and the mixture stirred for 15 minutes, then decanted from the amalgam residues into water (100 ml). Agent 16 separated as brown crystals when the tetrahydrofuran was stripped under vacuum at 20° C.; it was purified by dissolution in acetone and crystallization on addition of water to the resultant green solution. Agent 16 crystallizes with water as the axial base; the water is eliminated when the Agent is dissolved in organic solvents. A labile orange-colored adduct is formed when a small quantity of pyridine is added to the green solution of Agent 16 or its chelate precursor. Agent 16 is stable in air, although loss of the ethyl group and oxidation of the residue occurs on prolonged storage at ambient temperatures.

Treatment of MMA with Agent 16 using the method of Example 4 yielded poly(MMA) with molecular weight with 9,700 and polydispersity of 2.3. A similar treatment of addition of pyridine (8 mg) yielded polymer with molecular weight of 8,600, compared to the molecular weight of 18,000 obtained by treatment in the absence of the Agent or pyridine.

EXAMPLE 17

Bis-[$\mu$-[(2,3-butanedione dioximato)(2-)O:O']-tetrafluorodibonato(2-)-N,N'N'', N', '', ](methanol)cobalt (II), Agent 17, was prepared by stirring an ice-cooled finely powdered mixture of cobaltous acetate tetrahydrate (2 g) and dimethylglyoxime (1.9 g) in a nitrogen-purged solution of boron trifluoride etherate (10 ml) in diethyl ether (150 ml) for 6 hours, followed by recrystallization of the filtered solids from methanol. A deoxygenated mixture of MMA (100 g), AIBN (100 mg) and Agent 17 was added over a 3 hour period to hot butyl acetate maintained under ninrogen, followed by a 3-6 hour post-addition reaction period. The amounts of Agent, reaction temperatures, and average degrees of polymerization are shown in the Table:

| Agent (mg) | Temperature (°C.) | DP |
| --- | --- | --- |
| 2.5 | 80 | 10 |
| 5.0 | 80 | 5 |
| 2.5 | 90 | 12 |
| 5.0 | 90 | 6 |

I claim:

1. A process for the free radical polymerization of unsaturated monomers comprising polymerizing said monomers in the presence of a transition metal complex comprising a metal ion and at least one chelating agent, said transition metal complex acting as an initiator and chain transfer agent in the polymerization process and said metal complex being in accordance with formula (I):

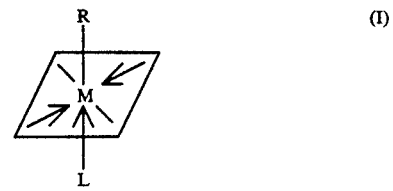

wherein
M is hexa-coordinated trivalent cobalt;
R is an axial organic group which has a carbon atom covalently bonded to said cobalt;
L is an axial ligand which is different from R and which is an electron pair donor which is coordinated with cobalt and which controls the stability and electron transfer properties of the transition metal complex.

2. A process as claimed in claim 1, wherein equatorial coordination is obtained from a single quadridentate chelating ligand, from two bidentate ligands, or from one bidentate ligand plus two monodentate ligands, or from four monodentate ligands.

3. A process as claimed in claim 2, wherein the complex has no net ionic charge and is soluble in non-polar or polar organic solvents.

4. A process as claimed in claim 1, wherein the complex contains equatorial ligands which are dioximes, dicarbonyl compounds, enolic carbonyl compounds, or hydroxy, carboxyl or enolically substituted azomethines.

5. A process as claim ed in claim 1, wherein the complex is a bis(dialkyl) glyoxime cobalt chelate of the formula (IV):

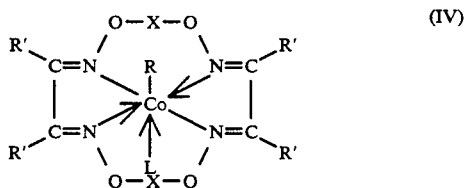

wherein R and L are as defined in claim 1, and the groups R' are alkyl groups, and wherein each of X is a hydrogen atom or difluoroborate group.

6. A process as claimed in claim 5, wherein R' is a methyl group.

7. A process as claimed in claim 1, wherein the complex is a salicylalde-hydediamine chelate of the formula (V):

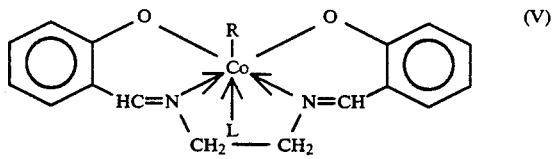

wherein R and L are as defined in claim 1.

8. A process as claimed in claim 1 wherein the complex is an acetylacetone-diamine chelate of formula (VI):

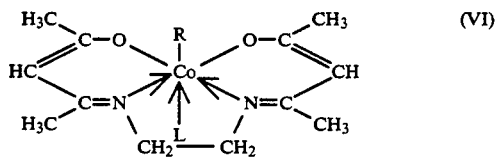

wherein R and L are as defined in claim 1.

9. A process as claimed in claim 1, wherein the axial ligand L is water, an alcohol, a thioether, an amine, a phosphine, a carbonyl or a carboxylate.

10. A process as claimed in claim 9, wherein the axial ligand L is a weakly basic tertiary amine.

11. A process as claimed in claim 1, wherein the axial ligand L is derived in situ from a monomer or another species present in the polymerization mixture.

12. A process as claimed in claim 1, wherein said process is carried out in the presence of at least one initiator other than the transition metal complex of formula (I).

13. A process as claimed in claim 1, wherein equatorial coordination is obtained from one or a combination of ligands selected from the group consisting of dioximes, and hydroxy, carboxyl or enolically substituted azomethines.

14. A process as claimed in claim 1, wherein R is an alkyl group and L is water, an alcohol, a thioether, an amine, a phosphine, a carbonyl, or a carboxylate, and wherein equatorial coordination is obtained from dioximes bridged with a difluoroborate group.

15. A process as claimed in claim 1, wherein R is an alkyl group, L is a pyridine or a phosphine, and equatorial coordination is obtained from dioximes.

16. A process as claimed in claim 1, wherein R is a methyl group, an ethyl group or an isopropyl group.

17. A process for the free radical polymerization of unsaturated monomers comprising polymerizing said monomers in the presence of a transition metal complex comprising a metal cation and at least one chelating agent, said transition metal complex acting as a chain transfer agent or an initiator and a chain transfer agent in he polymerization process, said transition metal complex being in accordance with formula I:

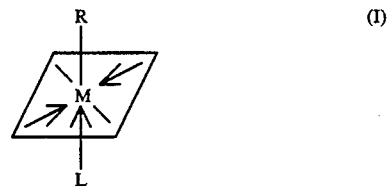

wherein M is hexa-coordinated trivalent cobalt, R is a substituted or unsubstituted alkyl, aryl, or heterocyclic group which has a carbon atom covalently bonded to the cobalt and which is capable of homolytic dissociation from the metal ion on heating or on irradiation with visible or ultraviolet light, and L is an axial ligand which is different from R and which is an electron pair donor which is coordinated with cobalt and which controls the stability and electron transfer properties of the transition metal complex.

18. A process as claimed in claim 17, wherein R is an alkyl group bearing one or more nitrile, ester, or aromatic groups as a substituent on the carbon atom bound to the metal ion.

19. A process as claimed in claim 17, wherein said process is carried out in the presence of at least one initiator other than the transition metal complex of formula (I).

* * * * *